United States Patent [19]

Vogelsang

[11] Patent Number: 5,036,891

[45] Date of Patent: Aug. 6, 1991

[54] CONDUIT BUNDLE FOR IN-GROUND CABLING

[75] Inventor: Horst Vogelsang, Herten, Fed. Rep. of Germany

[73] Assignee: Dipl.-Ing. Dr. Ernst Vogelsang GmbH & Co. KG, Herten/Westf., Fed. Rep. of Germany

[21] Appl. No.: 498,586

[22] Filed: Mar. 23, 1990

[30] Foreign Application Priority Data

Mar. 24, 1989 [DE] Fed. Rep. of Germany ....... 3909813

[51] Int. Cl.⁵ .......................... F16L 9/18; F16L 11/00
[52] U.S. Cl. .................... 138/115; 138/111; 138/117; 138/166; 174/95; 285/188
[58] Field of Search ......... 138/115, 117, 111, DIG. 9, 138/DIG. 11, 162, 166; 174/68.3, 95; 254/134.3 FT; 285/188; 350/96.23

[56] References Cited

U.S. PATENT DOCUMENTS

| 3,693,664 | 9/1972 | Schmunk | 138/111 |
| 4,729,409 | 3/1988 | Paul | 138/115 |
| 4,804,020 | 2/1989 | Bartholomew | 138/111 |

FOREIGN PATENT DOCUMENTS

| 3304333 | 8/1984 | Fed. Rep. of Germany | 174/95 |
| 3540690 | 11/1985 | Fed. Rep. of Germany | 174/95 |
| 3806663 | 3/1989 | Fed. Rep. of Germany | 174/95 |
| 1082953 | 6/1990 | Fed. Rep. of Germany | 174/95 |
| 1878 | of 1892 | United Kingdom | 174/95 |
| 0962074 | 4/1963 | United Kingdom | 138/111 |
| 2135136 | 8/1984 | United Kingdom | 174/95 |

Primary Examiner—William A. Cuchlinski, Jr.
Assistant Examiner—Vinh Nguyen
Attorney, Agent, or Firm—Herbert Dubno

[57] ABSTRACT

A conduit assembly for cabling has a multiplicity of plastic tubes with outer polygonal cross sections having more than three sides and is intended for direct insertion in the ground in a compact bundle in which there is practically no free space which can serve for water drainage. The tubes are connected with webs which are flexible and are so oriented that they are linearly aligned in an open array of the tubes so that the tubes are coplanar and can be coiled or coiled onto a drum or uncoiled from a drum.

13 Claims, 3 Drawing Sheets

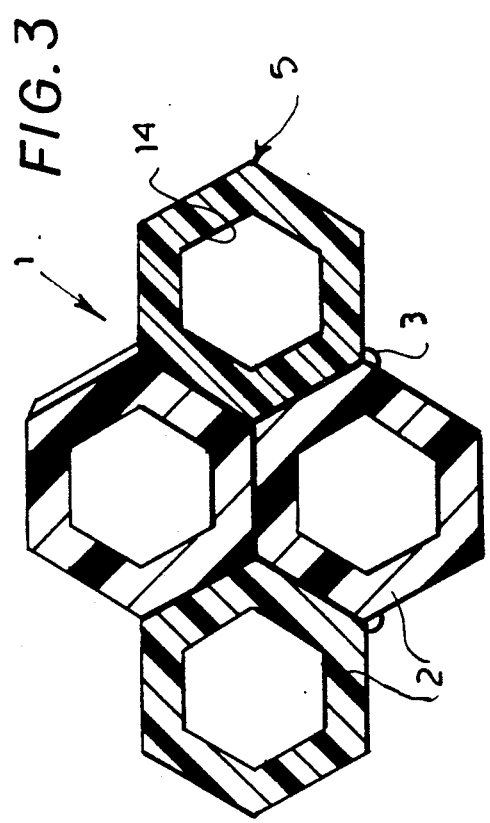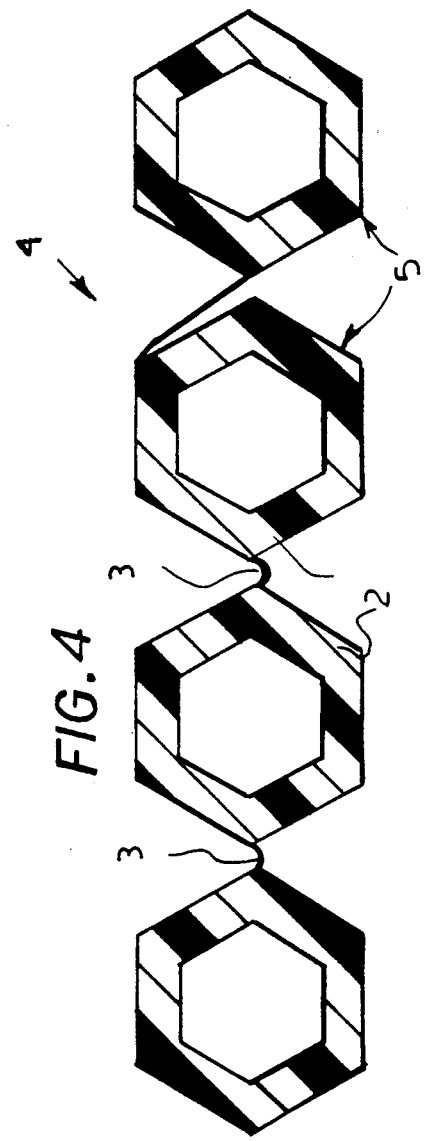

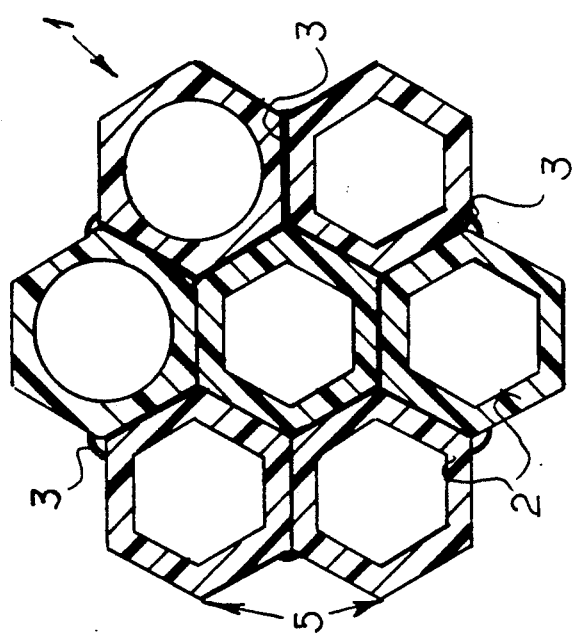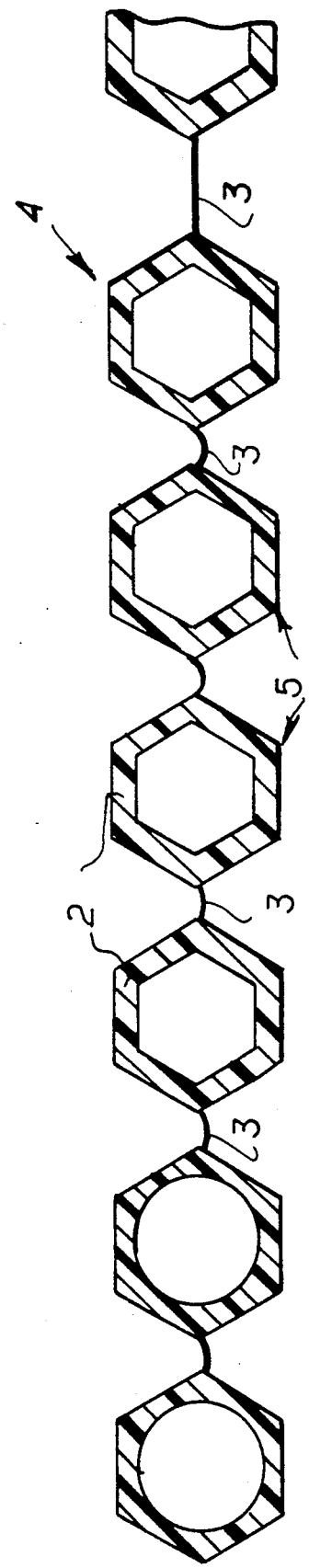
FIG.5
FIG.6

CONDUIT BUNDLE FOR IN-GROUND CABLING

CROSS REFERENCE TO RELATED APPLICATIONS

This application is related to my copending application Ser. No. 07/450,866 filed 14 December 1989.

FIELD OF THE INVENTION

My present invention relates to a cable guide assembly comprised of a multiplicity of tubes, especially extruded plastic or synthetic-resin tubes and which are so interconnected by flexible webs as to enable the tubes to fit together to form a compact bundle.

BACKGROUND OF THE INVENTION

As has been described in the aforementioned copending application, it is known to provide plastic or synthetic resin tubes which can be bundles and can serve as cable guide bundles enabling cabling, for example, communications or power cabling, to be passed through the tubes which can be placed in the ground.

The tube assemblies can be fabricated and wound on a drum or into a drum shape, can be transported in this state and, for forming the tube bundle, can be fed off the drum or out of the coil condition and then assembled so that the compact configuration of the assembly of tubes is formed, i.e. the tubes are fastened together into a tube bundle.

To affix the tubes in the tube bundle, strapping can be provided around the tubes or the tubes can be formed with connecting elements at their outer tubes of the array which can interfit or interlock. The configuration and attachments are such that the tube bundle can be laid either straight or in an arcuate configuration.

The material from which the tube assembly is formed should be sufficiently elastically deformable to allow the described coiling and uncoiling, the assembly of the tubes into the tube bundle and the detachment of interfitting parts or attachment thereof as described. For example, the tubes may be composed of polyethylene or polyvinylchloride. The tube assembly can be made by techniques known in the tube and pipe extrusion arts for the extrusion of plastic pipes and tubes.

Tube bundles for cabling have been provided in various configurations heretofore and by and large the tubes of the tube bundles have been composed of individual plastic tubes of round, usually circular cross section. This configuration simplifies fabrication and ensures the coiling and uncoiling of the assembly without problems.

However the individual plastic tubes in the cabling tube bundle do not fit together or define complementary structures in which other tubes can nest in a fully satisfactory manner. It is not possible, for example, with such constructions to provide highly compact and stable tube bundles capable of withstanding compression and like forces which may be severe in below ground uses. It is not possible, for example, to interfit the tubes so that square or rectangular parts thereof nest together in surface contact or engage in a nested manner like hexagonal structures of a beehive. As a consequence, in the prior art structures substantial gaps or interstices are formed between the individual cable-receiving tubes. If the tube bundle is not protected by an outer tube or sheath and is utilized for direct in-ground applications, shocks, pressures and the like can open gaps between the exterior and these interstices of the tube bundle into which water can pass and cause problems. For example, the interstices or spaces between the tubes can then form channels which can carry water into cable shafts or the like to which the cabling assemblies extend or from which the cabling assemblies leave.

It has been proposed to form a tube bundle from a multiplicity of plastic tubes which have modified triangular cross sections such that the vertices of these cross sections, corresponding to the edges defined between sides of the tube are greatly rounded While such tubes allow surface contact between the sides in a manner which cannot be duplicated with circular outer cross section tubes, nevertheless substantial free space is provided by reason for the considerable rounding of the triangle corners. These free spaces effectively become dead spaces, since cables cannot be fed through them as a practical manner. Furthermore, experience has shown that the engagement of groups of such tubes along their surfaces and the use of a triangular configuration so rigidifies the assembly that an assembly of such tubes cannot be wound or unwound readily, thereby creating difficulty in the usual handling of plastic tube assemblies for direct in-ground cabling purposes.

OBJECTS OF THE INVENTION

It is the principal object of the present invention to provide a tube assembly which can be readily coiled and uncoiled as has previously been described but wherein significant free space in the tube bundle is eliminated.

Another object of the invention is to provide a conduit assembly composed of plastic tubes and especially extruded synthetic resin tubes, whereby drawbacks of earlier systems are avoided.

It is also an object of this invention to provide a conduit assembly which extends the principles of my above-identified copending application.

SUMMARY OF THE INVENTION

These objects and others which will become apparent hereinafter are attained, in accordance with the invention in a conduit assembly, particularly for direct in-ground use for power and communication cables adapted to be passed through the individual tubes of the assembly and which comprises:

a multiplicity of mutually parallel plastic tubes having polygonal outer cross sections defined by at least four angularly adjoining sides and positioned to interfit with one another with the sides of the tubes in contact with one another in a configuration of the assembly as a compact bundle of the tubes wherein a plurality of the tubes define a pocket complementarily receiving at least one other of the tubes; and respective flexible webs formed on the tubes and linearly connecting the tubes together so that the tubes are connected in a coplanar array upon opening of the compact bundle.

In other words the cable guide tube bundle of the invention is comprised of a multiplicity of plastic tubes which may have identical inner and outer cross sections and each of which has a polygonal outer cross section with more than three corners or vertices corresponding to the edges between adjacent corresponding sides of the tubes. The individual tubes in the compact configuration of the tube bundle define pockets when they abut one another laterally at the complementary sides such that the pockets, in turn, complementarily receive another such tube, thereby eliminating any substantial free space among the tubes of the compact tube bundle. In the unbundled or open state, however, the tubes, interconnected by the aforementioned flexible webs, are joined linearly with one another, i.e. the webs or at least their connections to the tubes are in line, so that the tubes can form the coplanar array.

It will be appreciated that the cable assembly of the invention can be fabricated as a unit by extrusion, i.e. the tubes being unitarily formed with one another and with the respective webs in one piece by extrusion of the thermoplastic material through a suitably shaped extrusion die.

The edges defined between adjacent flat surfaces of the polygonal outer section can be rounded, although this rounding should be minimal to minimize the formation of free space within the tube bundle.

Because the outer cross section is polygonal with more than three sides, it is possible to interfit the tubes so that free space between them is eliminated and the drawbacks which derive from the use of circular outer cross section tubes are eliminated. A minimum rounding allows fabrication of the tubes with small tolerances and substantially exact calibration so that the corners or edges do not have an interference fit and drainage channels are not formed which can result in flooding of cable shafts or the like.

By and large, therefore, the tube assembly of the invention eliminates all of the drawbacks of the prior art systems described previously.

The tubes can have a rectangular, preferably square, outer cross section, although in a preferred embodiment of the invention, the cross section is generally hexagonal. The inner cross section of the tube can be polygonal and can correspond or be geometrically similar to the outer cross section, or can be round or circular as may be required.

The cable guide tube bundle according to the invention can have four such tubes or a greater number, selected in accordance with the number of sides to ensure the formation of the compact tube bundle as defined above.

BRIEF DESCRIPTION OF THE DRAWINGS

The above and other objects, features and advantages of my invention will become more readily apparent from the following description, reference being made to the accompanying highly diagrammatic drawing in which:

FIG. 3 is a view similar to FIG. 1 of an embodiment in which the inner and outer cross sections of the four tubes are regular hexagons;

FIG. 4 is a cross section similar to FIG. 2 of the embodiment of FIG. 3;

FIG. 5 is a cross sectional view through the compact tube bundle of a conduit assembly utilizing seven hexagonal outer cross section tubes; and FIG. 6 shows the coplanar array corresponding to this latter embodiment.

SPECIFIC DESCRIPTION

Figure 1A:
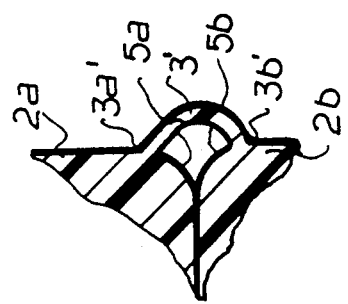
FIG. 1A is a detail view showing the connection of a web at the edges of two tubes joined by a web in the configuration of FIG. 1.

While, in FIGS. 1 through 6, the individual tubes of each array have been hatched differently to enable a distinction to be made between them, it will be understood that these tubes are extruded in one piece with one another and the respective webs of the respective assemblies (see the aforementioned copending application). Furthermore, while means for retaining the compact bundle configuration has been shown for the embodiment of FIGS. 1 and 2 and not illustrated in the remaining figures, these other embodiments may also have such means or may be held in the compact configuration by strapping or the like.

Similar reference numerals have been used throughout to designate similar functioning parts.

Figure 2:
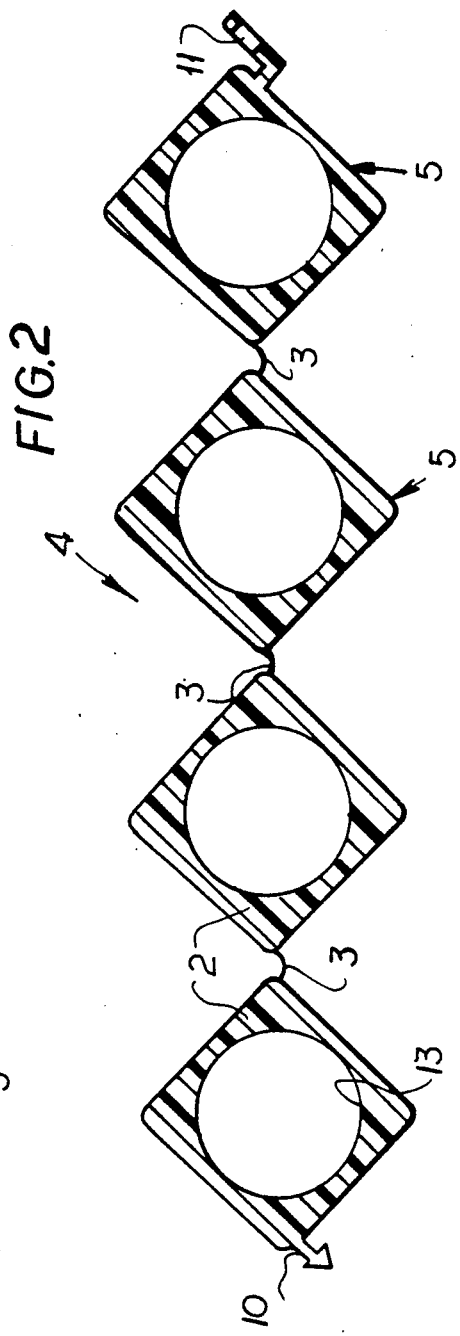
FIG. 2 is a cross section through the coplanar array of the assembly of FIG. 1.
Figure 1:
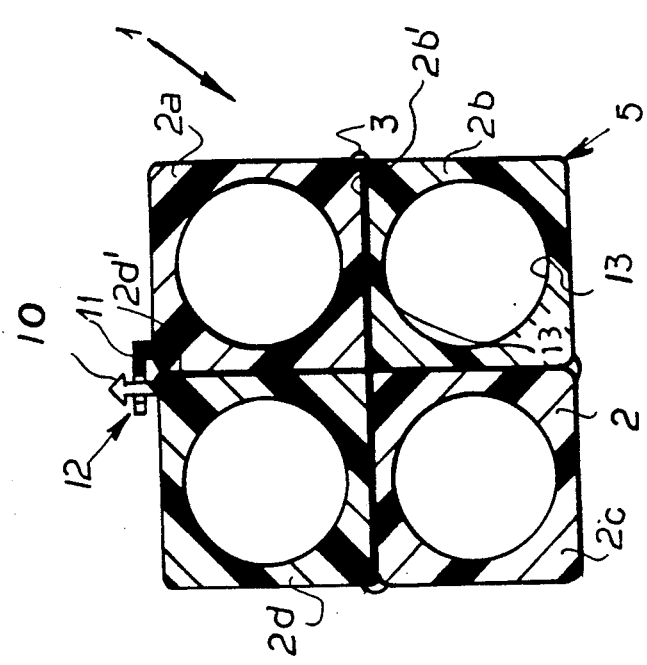
FIG. 1 is a diagrammatic cross section of the compact bundle configuration of a conduit assembly comprised of four square outer cross section tubes.

In FIGS. 1, 1A and 2, I have show a cable guide conduit assembly represented in its compact configuration at 1 and its coplanar configuration at 4 and provided to receive power or connection cables, particularly in a direct underground use. The assembly comprises a plurality of plastic tubes, especially extruded polyethylene or polyvinylchloride tubes 2. Four such tubes are employed in the embodiment of FIGS. 1 and 2 and each tube has more than three lateral sides, i.e. in cross section as an outer configuration of a regular polygon with more than three sides, for example, four sides in this embodiment.

The outer cross sections of the plastic tubes are so provided that in the compact bundle configuration 1, a plurality of such tubes define a pocket for another of these tubes. For example, the tubes 2b, 2c and 2d have surfaces 2b' and 2d' which define a pocket into which the tube 2a complementarily fits. This ensures a high degree of formed stability for the tube bundle 1, even when the bundle 1 is buried in the ground and this applies whether the bundle is held together by a tongue 10 and slot 11 fastening structure 12 as shown in FIG. 1 at the end tubes, or is strapped to maintain the tube bundle configuration.

From FIGS. 2, 4 and 6 it can be seen that the webs 3 connecting inner tubes and the inner tubes with end tubes the tubes are disposed generally along a line in the open configuration so that the tubes can form a coplanar array 4 in the unbundled state. From this configuration, of course, the tubes can be readily rolled together, utilizing the webs as film hinges into the compact bundle configuration. Because of the elastic deformability of the tubes 2 and 3, in the open or coplanar state, the tubes can be readily coiled on a drum and uncoiled from a drum like cables themselves. The corners 5 of the polygonal outer cross sections are slightly rounded so that a minimum of interference is provided in the fit between the tubes in the compact bundle.

The inner cross sections 13 can be circular or the internal cross sections can be polygonal as shown at 14 in the embodiment of FIGS. 3 and 4 where the tube can have an internal cross section which is geometrically similar to the external cross section. FIGS. 5 and 6 represent a hybrid configuration in which two of the tubes have circular inner cross sections while the remaining tubes have hexagonal internal cross sections.

In the embodiment of FIGS. 1 and 2, the tubes are of square external cross section while in the embodiment of FIGS. 3 through 6 the tubes have hexagonal external cross sections. In both cases the polygonal cross section is that of a regular polygon.

In the compact configurations of FIGS. 1, 3 and 5, a drainage channel which might cause flooding of a cable shaft is completely avoided. In the embodiment of FIG. 5, the plastic tubes have regular hexagonal outer cross sections and the webs 3 are so arranged that the tubes can be wound in a spiral manner to define the tube bundle. In all FIGS. 1 through 6, the webs 3 have been shown in an exaggerated thickness over that which would normally be provided, namely, that of a so-called film hinge, for convenience of illustration.

Turning now to FIG. 1A, it can be seen that the film hinge 3' is formed unitarily with the tubes 2a and 2b which it interconnects and adjoins these tubes at the rounded edges 5a and 5b thereof. The film hinge merges unitarily with the tubes at 3a' and 3b'.

I claim:

1. A conduit assembly for direct in-ground positioning for cabling, said assembly comprising:
   a multiplicity of mutually parallel plastic tubes having regular polygonal outer cross sections defined by at least four angularly adjoining sides and positioned to interfit with one another with said sides of said tubes in contact with one another in a configuration of said assembly as a compact bundle of said tubes wherein a plurality of said tubes define a pocket complementarily receiving at least one other of said tubes so that said bundle is free from interstices between said tubes of said compact bundle; and
   respective flexible webs formed on said tubes and linearly connecting said tubes together so that said tubes are connected in a coplanar array upon opening of said compact bundle.

2. The conduit assembly defined in claim 1 wherein adjacent ones of said sides of each of said tube adjoin at respective edges.

3. The conduit assembly defined in claim 2 wherein said webs are formed unitarily on said tubes at respective ones of said edges.

4. The conduit assembly defined in claim 2 wherein said tubes are of rectangular outer cross section.

5. The conduit assembly defined in claim 4 wherein said tubes are of square outer cross section.

6. The conduit assembly defined in claim 2 wherein said tubes are of hexagonal outer cross section.

7. The conduit assembly defined in claim 2 wherein said tubes are of circular inner cross section.

8. The conduit assembly defined in claim 2 wherein said tubes are of polygonal inner cross section.

9. The conduit assembly defined in claim 8 wherein said tubes are of regular-polygon inner cross section.

10. The conduit assembly defined in claim 2 wherein said coplanar array has end tubes at ends of said array and inner tubes between said end tubes, said inner tubes being connected together and to said end tubes by respective ones of said webs formed at diametrically opposite edges of at least some of said inner tubes.

11. The conduit assembly defined in claim 10 wherein said end tubes are formed with means for retaining said tubes in said configuration of said compact bundle.

12. The conduit assembly defined in claim 2 wherein said assembly comprises four of said tubes.

13. The conduit assembly defined in claim 2 wherein said assembly comprises seven of said tubes.

* * * * *